US006705520B1

(12) United States Patent
Pitroda et al.

(10) Patent No.: US 6,705,520 B1
(45) Date of Patent: *Mar. 16, 2004

(54) POINT OF SALE ADAPTER FOR ELECTRONIC TRANSACTION DEVICE

(76) Inventors: Satyan G. Pitroda, 301 Trinity La., Oakbrook, IL (US) 60523; Merul Patel, Flat 2 Gemini House 180-2 Bermondsey Street, London SE1 3TQ (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,529

(22) Filed: Nov. 15, 1999

(51) Int. Cl.$^7$ .................................................. G06K 5/00
(52) U.S. Cl. .................................. 235/382.5; 235/380
(58) Field of Search ............................... 235/380, 382.5

(56) References Cited

U.S. PATENT DOCUMENTS

| RE28,081 E | 7/1974 | Travioli ................. 235/61.11 E |
|---|---|---|
| 4,305,059 A | 12/1981 | Benton .................. 340/825.33 |
| 4,341,951 A | 7/1982 | Benton ........................ 235/379 |
| 4,454,414 A | 6/1984 | Benton ........................ 235/379 |
| 4,491,725 A | 1/1985 | Prichard ...................... 364/408 |
| 4,523,087 A | 6/1985 | Benton ........................ 235/379 |
| 4,575,621 A | 3/1986 | Dreifus ........................ 235/380 |
| 4,634,845 A | 1/1987 | Hale et al. .................. 235/350 |
| 4,650,981 A | 3/1987 | Foletta ........................ 235/449 |
| 4,689,478 A | 8/1987 | Hale et al. .................. 235/380 |
| 4,692,601 A | 9/1987 | Nakano ........................ 235/380 |
| 4,701,601 A * | 10/1987 | Francini et al. ............. 235/449 |
| 4,705,211 A | 11/1987 | Honda et al. ................. 235/380 |
| 4,739,295 A | 4/1988 | Hayashi et al. ............. 235/492 |
| 4,833,595 A | 5/1989 | Iijima .......................... 364/200 |
| 4,837,422 A | 6/1989 | Detloff et al. ............... 235/380 |

(List continued on next page.)

FOREIGN PATENT DOCUMENTS

GB          2255934 A     11/1992

OTHER PUBLICATIONS

Sprint Priority Gold$^{SM}$ Newsletter, Mar. 11, 1994,—"the Voice F NCARD$^{SM}$" 1994 Sprint Communications Co. L.P.(2pgs).

PC Magazine—Mar. 29, 1994, TRENDS, Trends & Technology Shaping the Personal Computer Market, "The PC in Your Wallet", publication (1 page).

(List continued on next page.)

*Primary Examiner*—Mark Tremblay
(74) *Attorney, Agent, or Firm*—Welsh & Katz, Ltd.

(57) ABSTRACT

An adapter for use with a conventional POS card reader to interface with PDA's, Wireless Phones, and other Handheld devices, through Infrared or RF media, such that signals received from, the devices can be, converted to conventional magnetic stripe and/or smart card format, as required by the conventional POS card readers. The adapter includes a housing, including at least a reader-insertable portion capable of being inserted in the card reader, a receive circuit in the housing, a processor in the housing connected to the receive circuit; and a point of sale interface in the reader insertable portion of the housing and connected to the processor. The housing may be approximately the size of a conventional credit card and may be fully reader-insertable.

The point of sale interface comprises a magnetic stripe emulator, a smart card emulator, or both. The magnetic stripe emulator may comprise at least one electromagnet. Two electromagnets may be used to emulate two tracks of a conventional magnetic card stripe. The receive circuit may comprise an infra-red receiver, a radio-frequency receiver, or other suitable circuit. The adapter may further include a transmit circuit, wherein the receive circuit and the transmit circuit include a transceiver. The adapter may further include a data buffer connected to the processor, the data buffer configured to purge data after a predetermined period of time or after a predetermined number of data transfer operations.

40 Claims, 13 Drawing Sheets

U.S. PATENT DOCUMENTS

| | | | |
|---|---|---|---|
| 4,849,613 A | 7/1989 | Eisele | 235/379 |
| 4,849,614 A | 7/1989 | Watanabe et al. | 235/380 |
| 4,858,121 A | 8/1989 | Barber et al. | 364/406 |
| 4,891,506 A | 1/1990 | Yoshimatsu | 235/492 |
| 4,910,774 A | 3/1990 | Barakat | 380/30 |
| 4,910,775 A | 3/1990 | Yves et al. | 380/25 |
| 4,918,631 A | 4/1990 | Hara et al. | 364/708 |
| 4,928,001 A | 5/1990 | Masada | 235/492 |
| 4,973,828 A | 11/1990 | Naruse et al. | 235/380 |
| 4,983,816 A | 1/1991 | Iijima | 235/379 |
| 5,015,830 A | 5/1991 | Masuzawa et al. | 235/441 |
| 5,017,766 A | 5/1991 | Tamada et al. | 235/492 |
| 5,023,908 A | 6/1991 | Weiss | 380/23 |
| 5,055,662 A | 10/1991 | Hasegawa | 235/492 |
| 5,055,968 A | 10/1991 | Nishi et al. | 361/395 |
| 5,068,521 A | 11/1991 | Yamaguchi | 235/492 |
| 5,150,420 A | 9/1992 | Haraguchi | 235/380 |
| 5,153,842 A | 10/1992 | Dlugos, Sr. et al. | 235/380 |
| 5,157,247 A | 10/1992 | Takahira | 235/492 |
| 5,168,151 A | 12/1992 | Nara | 235/492 |
| 5,189,287 A | 2/1993 | Parienti | 235/375 |
| 5,218,188 A | 6/1993 | Hanson | 235/375 |
| 5,276,311 A | 1/1994 | Hennige | 235/492 |
| 5,301,105 A | 4/1994 | Cummings, Jr. | 364/401 |
| 5,590,038 A | 12/1996 | Pitroda | 395/241 |
| 5,834,756 A * | 11/1998 | Gutman et al. | 235/380 |
| 5,884,271 A | 3/1999 | Pitroda | 705/1 |
| 5,955,961 A * | 9/1999 | Wallerstein | 340/825.33 |

OTHER PUBLICATIONS

Business Life Magazine, Dec./Jan. 1994/95, "The Era of the Smart Card", publication (4 pages).

Mondex Magazine—The World of Mondex Global Electronic Cash, Summer 1996, "What's up doc?—The smart way to pay for infotainment", publication (3 pages).

"SmartTV tm", Mar. 1, 1997 (four pages plus cover page).

CyberCash Microsoft CPC Wallet, Aug. 3, 1999—"What is the Microsoft Wallet?"—Internet publication (2 pages)—http://www.cybercash.com/ms/coincpc/description.htlm.

Ilium Software's eWallet—"eWallet™" All your Important Information Secure, Convenient, Centralized Handheld, Palmsize and Desktop PCs—Jul. 26, 1999, Internet publication (3 pages)—http://www.iliumsoft.com/wallet.htm.

Ilium Software's KeepTrack for Windows CE—"Keep Track"—Version 2.0: Many New Features Credit, Debit, ATM card transactions—Handheld, Palmsize and Desktop PCs, Jul. 26, 1999 Internet publication (3 pages)—http://www.iliumsoft.com/keeptrk.htm.

Ilium Software: Handheld Software for Windows CE—"Ilium Software—Simple Software for a Simpler Life", Jul. 26, 1999, Internet publication (4 pages)- http://www.iliumsoft.com/about.htm.

Ilium Software Products—Product Information—Jul. 26, 1999, Internet publication (2 pages)—http://www.iliumsoft-.com/products.htm.

Q*Wallet—Electronic Wallet for Windows 95/98/NT—"Q*Wallet Home", Jul. 26, 1999, Internet publication (2 pages)—http://www.qwallet.com/index.shtml.

Q*Wallet Screenshots—Electronic Wallet for Windows 95/98/NT—"Q*WalletScreenshots", Jul. 26, 1999, Internet publication (3 pages)—http://www.qwallet.com/screens.shtml.

Welcome To EntryPoint—"Welcome to entrypoint!"—"PointCast+Ewallet=entrypoint™", Sep. 22, 1999, Internet publication (15 pages)—http://www.entrypoint.com/.

Palm Wars—"3COM tries to solve its palm problem"–"The creators of the Palm launch a new device, and 3Com fights back" by Daniel Roth. FORTUNE, pp. 111–112, Oct. 11, 1999 (2 pgs.).

Nokia—"Next Up for Cell Phones: Weaving A Wireless Web" by Janet Guyon. FORTUNE, pp. 61–66, Oct. 25, 1999 (6 pages).

*Undated Brochure*—Geneva—nOw" –Hewlett Packard—Tribune De Geneve, (2 pages).

TOSHIBA—Mobile Multimedia—"TEGACKY PM–T101—Touch–Pen Entry PHS Phone"—(1 pg.).

*Publication Unknown*—Technology—"Small Is Beautiful"—(3 pages).

"VIRTUALCARD—magnetic card simulator"—Mar. 29, 2000, with copyright indicated as (Jan. 1999)—Internet publication (20 pages)—http://www.virtualcard.co.nz/index.html.

* cited by examiner

POINT OF SALE ADAPTER FOR ELECTRONIC TRANSACTION DEVICE

FIELD OF INVENTION

This invention relates generally to adapting an electronic transaction device to conventional point of sale terminals. In particular, the invention relates to an adapter that dynamically emulates a magnetic stripe of a conventional plastic card, metallic contacts of a smart card, or both.

BACKGROUND

The subscriber base for wireless telephones is already enormously large and is forecast to grow rapidly. Some estimates put current wireless telephone subscribers at 400 million users globally, and telephone manufacturers estimate that one billion wireless telephones will be in use by 2004. Wireless telephones typically have a compact housing with microprocessor, memory, input and output circuits and a battery. Wireless telephones also include dialing, transmitting and receiving circuitry. There are various embodiments of wireless telephones, including analog (AMPS), Global Standard for Mobile Communication (GSM), code division multiple access (CDMA) and time division multiple access (TDMA). In addition to basic communications circuitry, wireless telephone manufacturers are adding features normally found on electronic organizers, such as date books, address books, and infra-red communications devices.

Personal Digital Assistants (PDAs) are also becoming very popular. PDAs are a form of handheld electronic organizer, typically having date books, address books, to-do lists, memo pads, and other features. PDAs typically include a compact housing with a hardware environment consisting of a microprocessor, memory, input and output circuits and a battery. Many PDAs include metallic contacts and infra-red circuitry for input and output circuitry. Various operating systems are available, as are various software applications. Operating systems for PDAs include Palm OS, Windows CE, and other operating systems. Some PDAs are integrating wireless communications.

Another type of handheld electronic device is a Universal Electronic Transaction Card ("UET Card"). UET Cards have been proposed to receive, store, and process information relating to a plurality of different accounts, thereby consolidating numerous cards into one card. See, for example, U.S. Pat. Nos. 5,590,038 and 5,884,271, the disclosures of which are incorporated by reference. In one example of a Universal Electronic Transaction Card, the card stores electronic images of the plastic cards which it replaces, and allows a user to conduct a transaction at a Point of Sale Terminal (POS).

It is contemplated that these handheld devices will become integrated to one degree or another. For example, UET Cards have been proposed with many features of currently available PDAs. See, for example, the previously mentioned U.S. Pat. Nos. 5,590,038 and 5,884,271. Also, as mentioned above, some wireless telephones are integrating PDA type functions, and some PDAs are integrating wireless communications. Additionally, PDAs, wireless telephones and other handheld computing devices may be programmed or otherwise configured and used to conduct electronic transactions. UET Cards, and computing devices programmed to perform electronic transactions, such as PDAs and wireless telephones, are generally referred to herein as "electronic transaction devices."

Generally, an electronic transaction device may be a handheld device configured to allow a user to electronically emulate some or all of various aspects of a traditional wallet containing an assortment of plastic cards, cash and cash equivalents. One of the advantages of an electronic transaction device is the fact that the device allows the storage and use of multiple plastic cards—multiple credit and debit cards, identification cards, multiple membership and affinity group cards etc. Existing credit card (and other plastic card) images may be electronically stored and reproduced on the electronic transaction device display. Receipts may also be stored, eliminating paper receipts. Electronic transaction devices may include additional features, such as wireless telephony and PDA features.

Another large installed base of equipment comprises Point of Sales (POS) terminals. POS terminals include terminals having plastic card magnetic stripe readers and terminals having smart card readers.

Plastic cards having a magnetic stripe are known to be used with POS terminals having magnetic stripe readers. Relevant industry standards for magnetic stripe cards include, but are not necessarily limited to, ISO 7810, ISO 7811, and ISO 7813. Some examples are plastic Credit Cards, Bank—Debit & Check Cards, Automatic Teller Machine Cards, Membership Cards, Business or Access Cards, Identification Cards, College Identification Cards, Airline Cards, and others. The magnetic stripe generally includes pre-recorded information, which may identify the card issuer, account number, identity of an authorized card user, or other relevant information. Typically, the magnetic stripe is used to establish the identity of the cardholder or enable a transaction. Such transactions may or may not be monetary in nature.

Another type of card is a "smart card." Smart cards are available with metallic contacts, without metallic contacts, and as hybrid cards. The standard for contact-type smart cards is ISO 7816. Contactless-type smart cards will be governed by the ISO 14443 standard. "Smart cards," as used herein, refers to cards adhering to one or both of these standards.

A typical POS may include a card reader, such as a card reader configured to read magnetic stripes conforming to ISO 7810, ISO 7811, and ISO 7813. By "swiping" a magnetic stripe card through the card reader, the card reader establishes the account number and identity of the cardholder. Such a POS reader may then communicate with the issuer of the card to determine the validity of the account and consequently approve or deny the transaction.

POS card readers are not limited to sales transactions. In offices, manufacturing facilities, or business environments, for example, employers may issue plastic identification cards to employees with a magnetic stripe on the card. This enables the readers to establish the identity of the cardholder, unlock doors or gates, log in and log out the entry and exit times respectively and in certain cases compute wages. In a school, college or university, an identification card with the magnetic stripe allows students to access laboratories, libraries, and other campus facilities, store cash values for transactions on campus. In these situations, the magnetic stripe on the plastic card is an important component which enables the card to function in the targeted environment.

With an electronic transaction device, one possible way of using it at a POS for performing a transaction (depending on the environment in which the device is being used, the transaction may or may not be monetary in nature) is to transmit information through an infrared or proximity RF link or by wireless or wired telephone link. PDA's, wireless telephones, and UET Cards may be equipped with an infrared transceiver. Wireless telephones of course, include wireless telephone communications circuitry. However, sending information to and receiving information from a POS or terminal equipment (TE) would require the POS (or TE) to also be equipped with a corresponding transceiver, along with the supporting hardware, software and training for the personnel handling the equipment.

Currently existing POS terminals comprise an extensive infrastructure of card readers, both magnetic and smart card, and the supporting networks and protocols for communication. One potential hurdle for the widespread adoption of electronic transaction devices such as Universal Electronic Transaction Cards and similarly configured PDA's and wireless telephones is compatibility with the existing infrastructure of magnetic card readers. For example, the prospect of including a pre-recorded magnetic stripe dedicated to one account on an electronic transaction device may impair one of the benefits of the electronic transaction device, namely, the ability to conduct transactions using a plurality of accounts. Also, retrofitting the established pre-existing base of POS terminals with a new communication port such as infra-red or radio frequency communication, would require both hardware and software modifications. Also, the introduction of such modifications may necessitate re-training of personnel that operate POS terminals. The cost of such modification is not trivial, considering the number and variety of POS terminals, such as grocery store registers, automatic teller machines, and pay-at-the-pump filling stations, to name a few.

SUMMARY

What is provided is an adapter for use with a conventional POS card reader to interface with PDA's, Wireless Phones, and other Handheld devices, through Infrared or RF media, such that signals received from the devices can be converted to conventional magnetic stripe and/or smart card format, as required by the conventional POS card readers. The adapter includes a housing, including at least a reader-insertable portion capable of being inserted in the card reader, a receive circuit in the housing, a processor in the housing connected to the receive circuit; and a point of sale interface in the reader insertable portion of the housing and connected to the processor. The housing may be approximately the size of a conventional credit card and may be fully reader-insertable.

The point of sale interface comprises a magnetic stripe emulator, a smart card emulator, or both. The magnetic stripe emulator may comprise at least one electromagnet. Two electromagnets may be used to emulate two tracks of a conventional magnetic card stripe. The receive circuit may comprise an infra-red receiver, a radio-frequency receiver, or other suitable circuit. The adapter may further include a transmit circuit, wherein the receive circuit and the transmit circuit include a transceiver. The adapter may further include a data buffer connected to the processor, the data buffer configured to purge data after a predetermined period of time or after a predetermined number of data transfer operations.

A method of using an adapter of the present invention with a point of sale card reader may include the steps of selecting a card on an electronic transaction device, placing the adapter in the card reader, transmitting information corresponding to the selected card from the electronic transaction device to the adapter, the adapter converting the information corresponding to the selected card to a format readable by the card reader, and the card reader reading the converted information.

The step of converting the information corresponding to the selected card to a format readable by the card reader may further comprise emulating a magnetic stripe or emulating a smart card. The step of emulating a magnetic stripe may further comprise generating electromagnetic signals. The step of emulating a magnetic stripe may also further comprise receiving the information corresponding to the selected card, formatting the information corresponding to the selected card to conform with magnetic stripe conventions, and dynamically writing the formatted information to an electromagnet.

The step of placing the adapter in the card reader may occur before the step of transmitting information. Alternatively, the step of transmitting information may occur before placing the adapter in the card reader, and further comprises the step of buffering the information corresponding to the selected card in the adapter. The buffered information may be purged after the step of reading the buffered information at the card reader.

In another embodiment, an electronic transaction device is adapted for use with point of sale card readers, and includes a housing, adapted to fit in a pocket or purse, the housing including at least a reader-insertable portion capable of being inserted in the card reader, a processor, enclosed in the housing, adapted to process account information relating to at least one service institution account associated with a user of the electronic transaction device, a display, connected to the processor and adapted to display the account information, a memory, connected to the processor and adapted to store the account information; and a point of sale interface in the reader insertable portion of the housing, connected to the processor and adapted to transmit the account information to a point of sale card reader. The point of sale interface may comprise a magnetic stripe emulator, a smart card emulator, or both.

DETAILED DESCRIPTION

Figure 1:
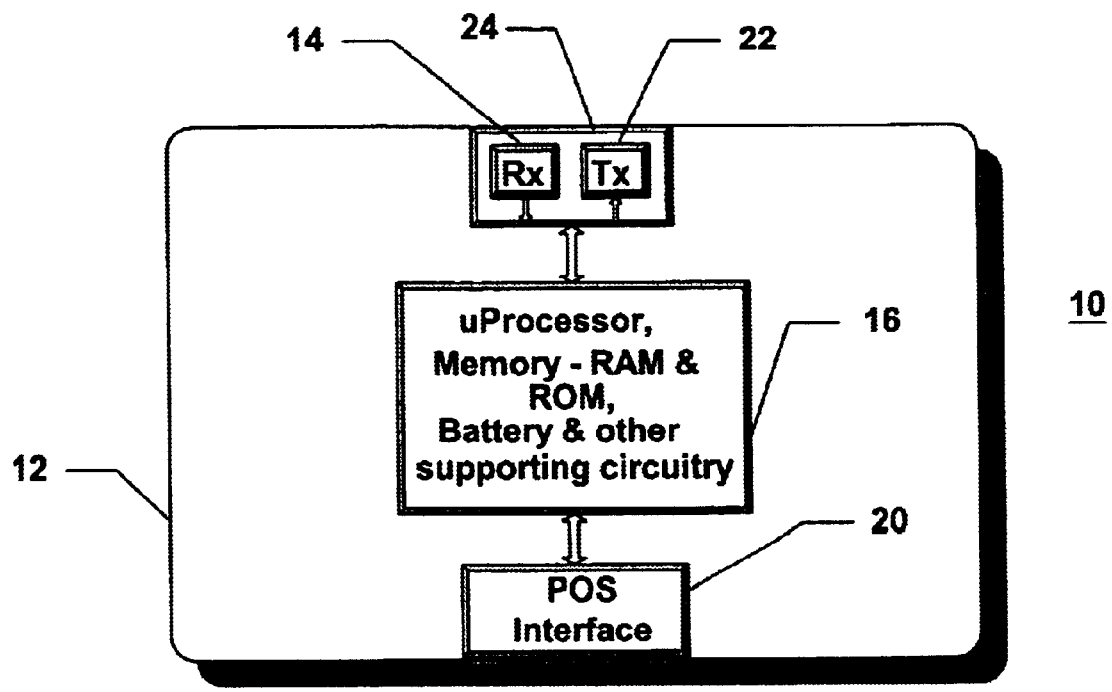
FIG. 1 is an illustration of one example of an adapter of the present invention.
Figure 7:
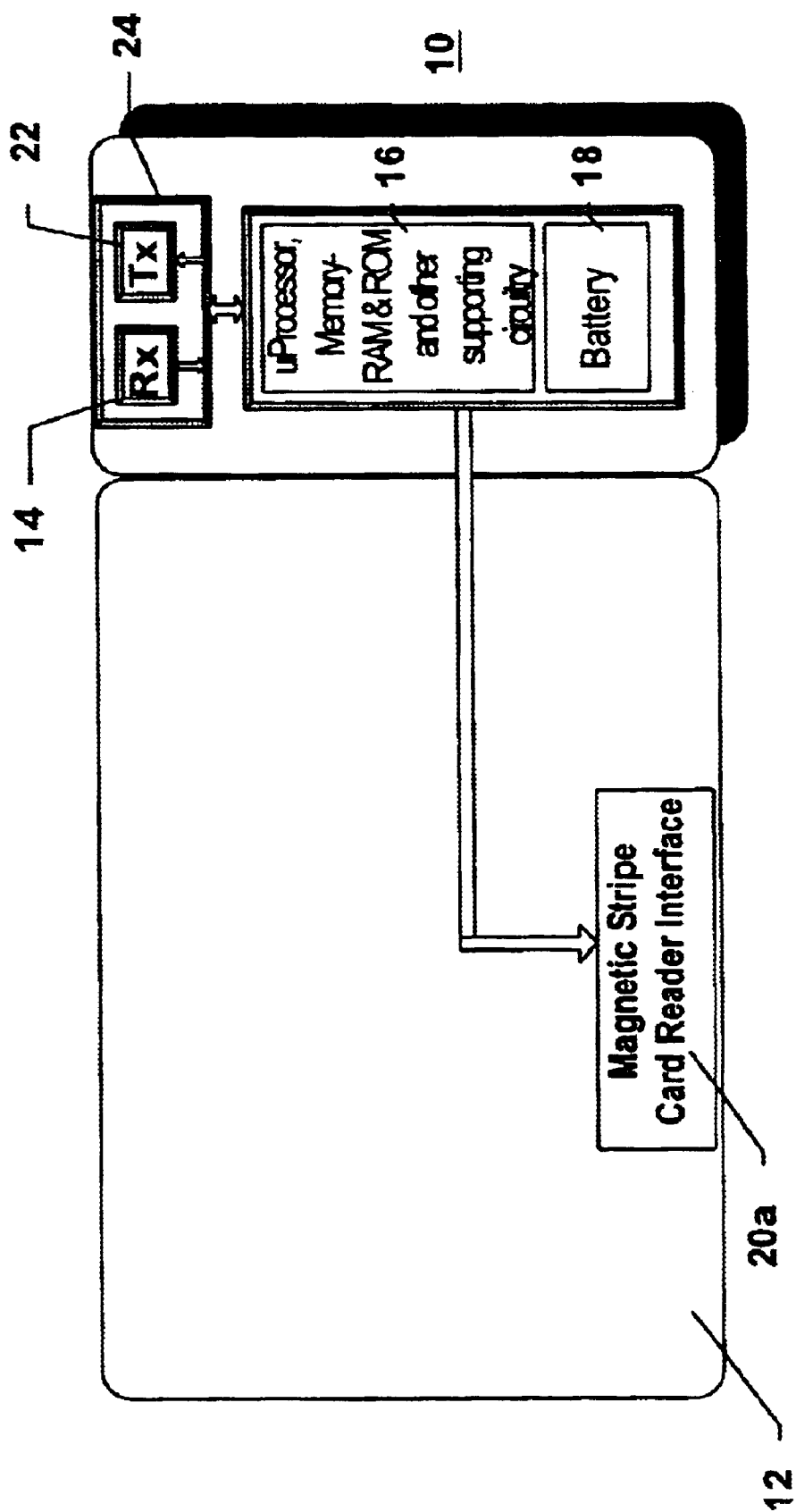
FIG. 7 is an illustration of an example of an adapter of the present invention having a magnetic stripe POS interface.

Referring to FIGS. 1 and 7, one embodiment of an adapter 10 for electronic transaction devices is illustrated. A housing 12 encloses a receive circuit 14, a processor 16, a battery 18, and a POS interface circuit 20. The POS interface circuit 20 may comprise a magnetic stripe interface 20a, a smart card interface 20b, a combination of a magnetic stripe and a smart card interfaces, or other suitable POS interfaces.

The housing 12 may have external dimensions approximately the same as conventional plastic cards with magnetic stripes. See FIGS. 2, 8, and 10. In the alternative, referring to FIGS. 7, 9, and 12, the housing 12 may be thicker, or otherwise larger or smaller than, a conventional plastic card, and further include a portion 36 that may be inserted into a conventional card reader 44.

The receive circuit 14 may comprise an infra-red receive circuit, a proximity radio-frequency circuit, a wireless application protocol (WAP) circuit, a metallic contact circuit, or other suitable circuit, or any combination thereof. Alternatively, receive circuit 14 may further comprise a transmit circuit 22, and thereby comprise a transceiver 24. The processor 16 takes the data received by the receive circuit 14 and processes the data into a format compatible with a conventional card reader 44.

The processor 16 may be configured to have identification information, such as a unique identification number or other information. For example, if used in a retail store environment, the processor may be configured with the retail store name, location, and department within the store. The processor may also be configured with a unique identification number. In another example, if privately used by the user of an electronic transaction device, the processor may be configured with the name, address, and telephone number of the user. This information may be programmed by the card manufacturer, issuer, or user.

Figure 2:
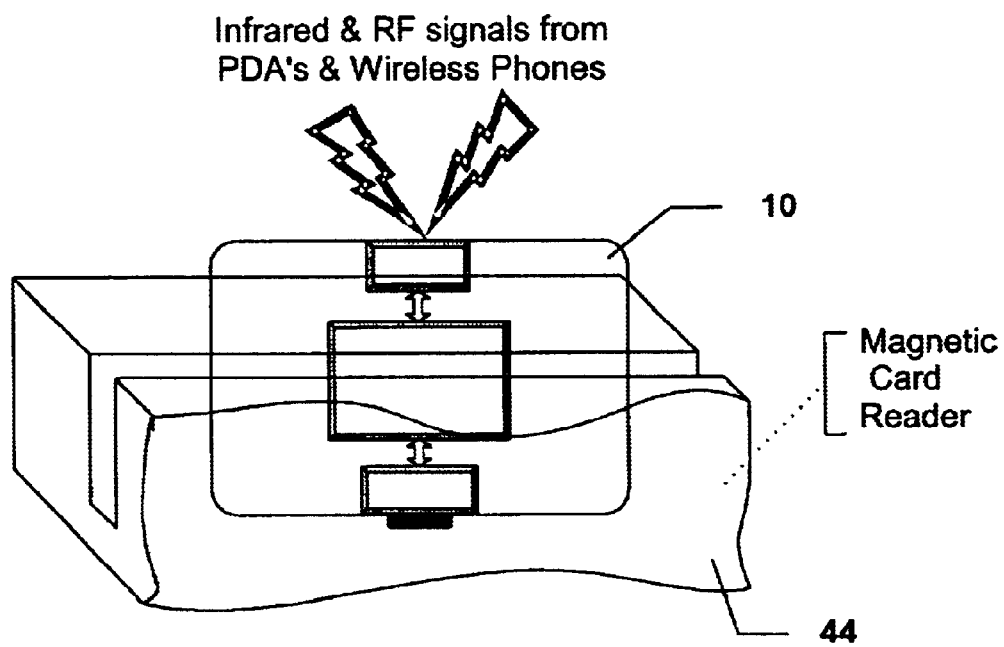
FIG. 2 is an illustration of one example of an adapter of the present invention in combination with a conventional magnetic stripe card reader.
Figure 3:
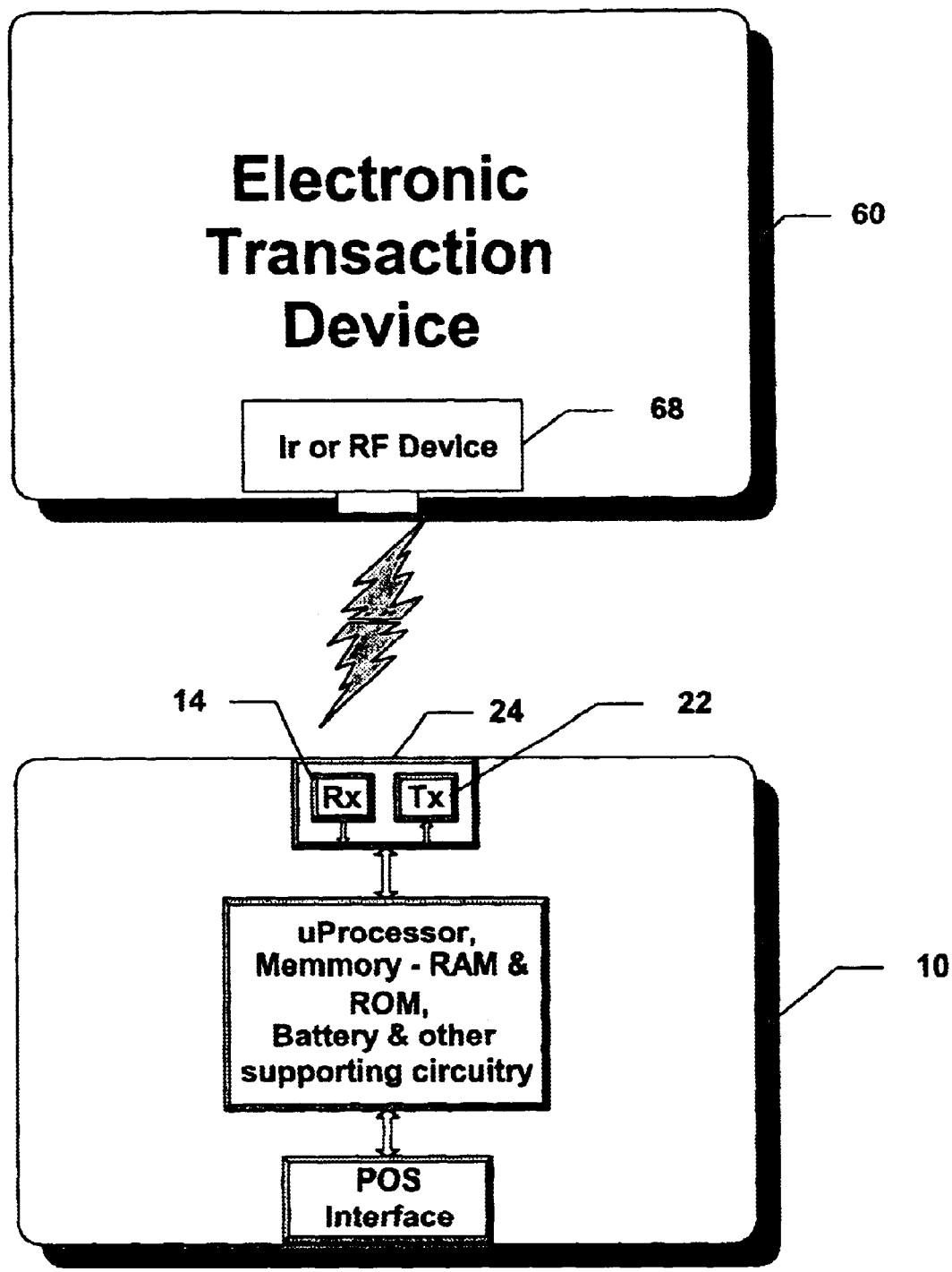
FIG. 3 is an illustration of an electronic transaction device in conjunction with an example of the adapter card of the present invention.

Referring to FIGS. 2 and 3, in use, the adapter 10 is placed in the card reader 44 with the POS interface circuit 20 positioned near the sensors of the card reader 44. The adapter 10 may be held stationary during a read operation. An electronic transaction device 60 transmits the information via I/O interface 68 that would typically be pre-recorded on a magnetic stripe 42 or smart card chip to the adapter 10. The adapter 10 receives the information, formats the information to conform with conventional card reader formats, and writes data to the POS interface 20. In the case of magnetic stripe emulation, reliability may increase because the rate of the data being transmitted from the adapter 10 to the card reader 44 is now controlled by the hardware and software of the electronic transaction device and adapter 10, rather than by a "swipe" of a card through a card reader 44.

The conventional hardware and software of card readers 44 do not require change. In the example of an adapter 10 with the electromagnets 30 simulating a magnetic stripe 42, data is dynamically written to the POS interface circuit 20 to emulate a conventional card swipe. Accordingly, the adapter card neither has "static" nor "spatially coded" data. The processor 16 and POS interface circuit 20 convert digital data into an alternating current signal through the electromagnets 30, which induce flux changes in the reading sensor. The flux changes correspond to the motion of a static pattern of magnetic bits past a sensor. The magnitude of the flux change induced by the coil is within defined standards for conventional magnetic stripe cards.

Figure 4:
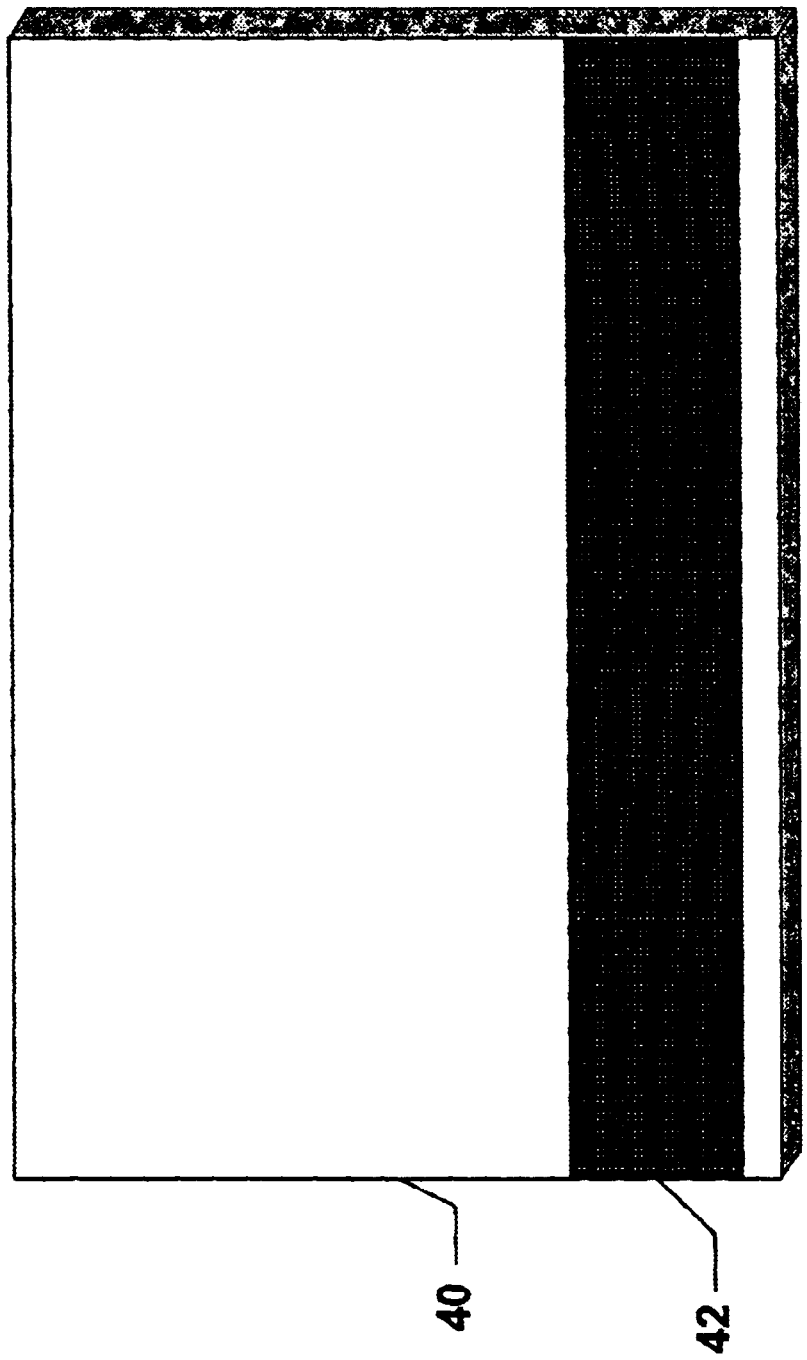
FIG. 4 is an illustration of a conventional plastic card with a magnetic stripe.

The POS interface 20 may be designed to dynamically emulate a conventional static magnetic stripe 42 on a conventional plastic card 40. In the context of emulating a conventional plastic credit card, such emulation may include conforming signal strength and data formats to relevant industry standards, such as ISO 7810, 7811, and 7813. Referring to FIG. 4, such a conventional typical plastic card 40 including a magnetic stripe 42 is illustrated. The thickness of such a card is about ~0.75 mm. The dimensions of the actual stripe may differ from one card manufacturer to another, but each stripe typically has information magnetically encoded in the form of two to three tracks. These tracks contain data magnetized on the stripe 42. The data is generally pre-recorded by the card issuer and is not configurable by the card user. In the context of cards other than conventional plastic credit cards, emulating a magnetic stripe may involve different relevant standards.

Figure 5:
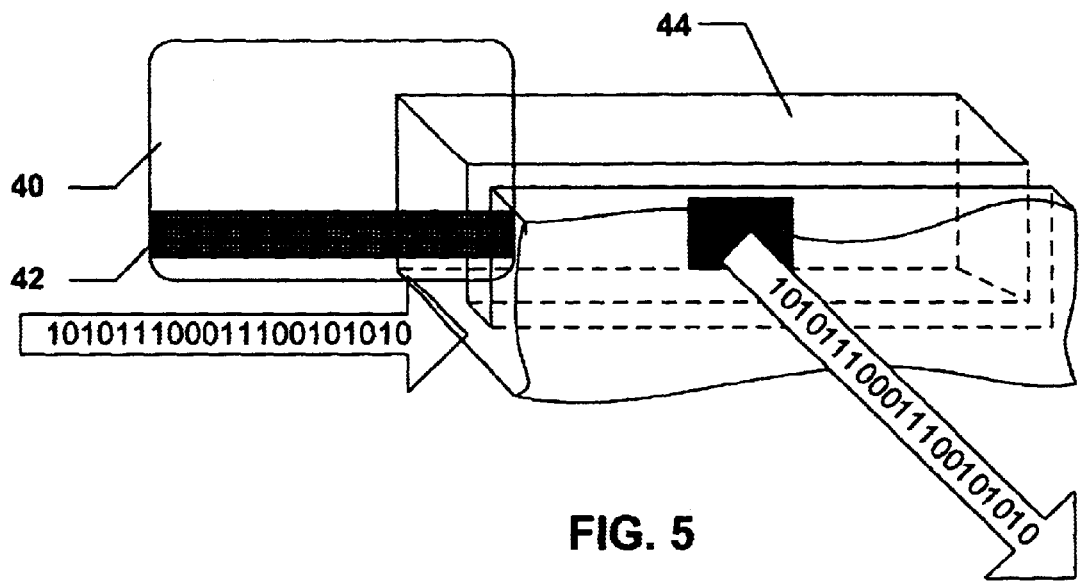
FIG. 5 is an illustration of a conventional plastic card with a magnetic stripe and a conventional magnetic stripe card reader.

Referring to FIG. 5, a cut out front view of a conventional magnetic card reader 44 is illustrated. The card reader 44 may be connected to a cash register and a bar code reader at the POS of a merchant, or may be connected to some other terminal equipment in a non-retail environment. FIG. 5 also shows a plastic card 40, with the information on the magnetic stripe 42, being "swiped" through the card reader 44. The pre-recorded data on the conventional plastic card 40 may be thought of as static, spatially coded data. The data is "static" because it typically does not change value over time. The data is "spatially coded" because the magnetic information is in sequence from one end of the stripe to the other, and does not change location.

FIG. 5 shows an arrow along the length of the stripe, which indicates the direction in which the card is being swiped. The 1's and 0's on the arrow are symbolic of the digital data magnetized on the stripe. This static data on the card is stored using frequency encoding. Another arrow, leaving the reader, depicts the information being read off the card and being sent over a network, typically for validation to the card issuer.

In this example, the pre-recorded "0" encoded spatially first on the magnetic stripe 42 is read chronologically first by the magnetic card reader 44. The plastic card 40 is swiped quickly through on a groove provided to guide the plastic card 40 through the card reader 44, enabling sensors on the card reader 44 to read the spatial information magnetized on the tracks. The swiping motion of the spatially-encoded data of the plastic card 40 past the stationary sensors of the card reader 44 effects a transmission of the spatially encoded data in time. The rate of transmission is determined by the speed at which the plastic card 40 is swiped. Since the rate of "swipe" is often controlled by a person, card readers 14 are designed with broad tolerances. The typically induced signal strength when a plastic card 40 with a magnetic stripe 42 is swiped in a card reader 44 is ~20 mV.

Figure 6:
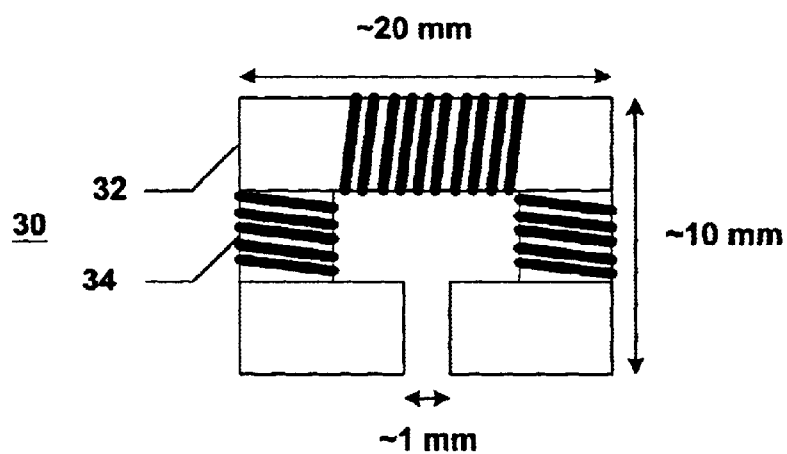
FIG. 6 is an illustration of an example of an electronic magnetic coil of one example of the present invention.
Figure 8:
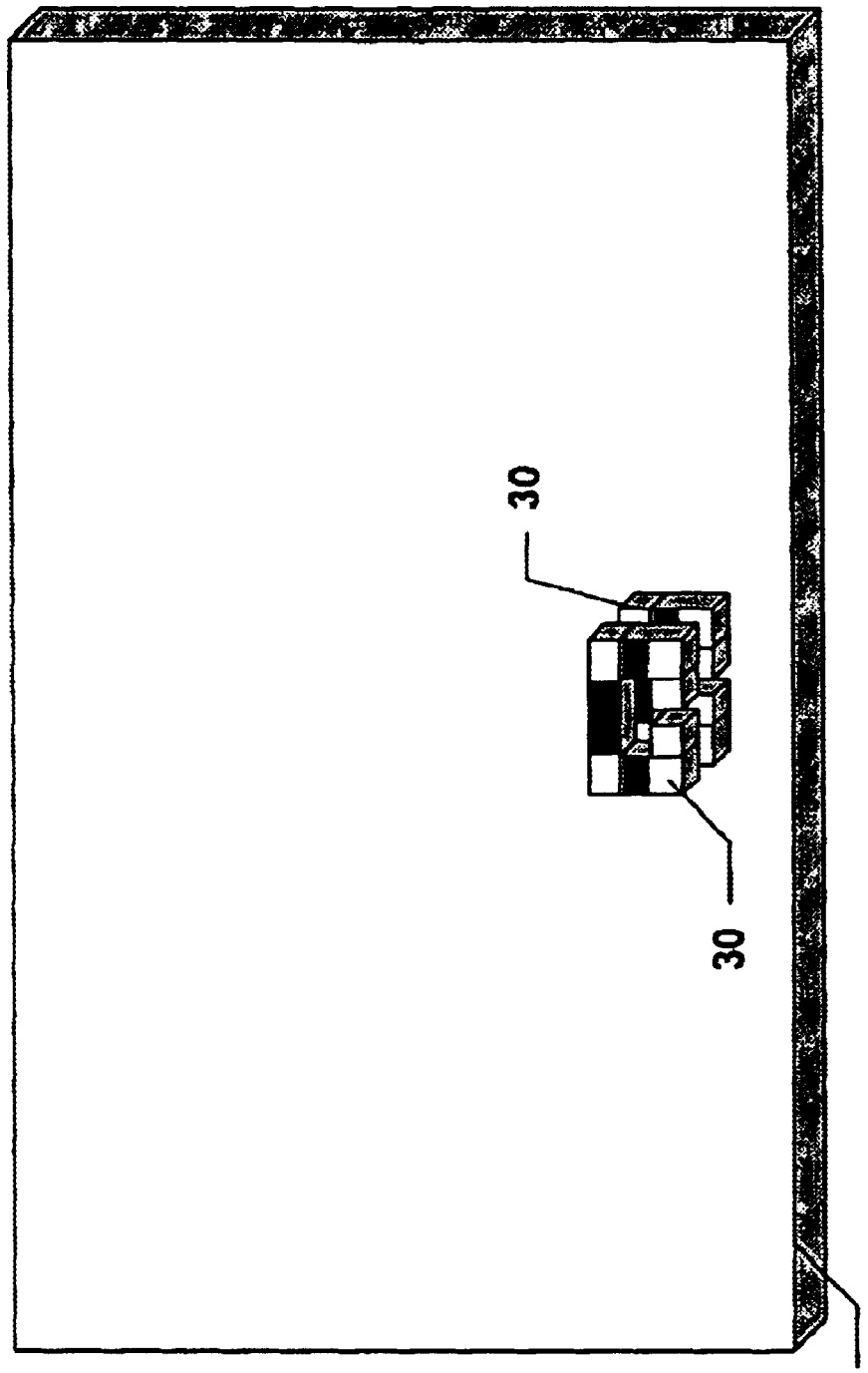
FIG. 8 is another illustration of the example of the adapter card having a magnetic stripe POS interface.

Referring to FIGS. 6, 7, and 8, one example of a POS interface circuit 20a comprising a magnetic field circuit is illustrated. The illustrated example is an electromagnet 30 having a core lamination 32 wrapped with a wire coil 34. A laminate of ~0.5 mm thickness may be used, with a total assembly thickness at ~0.75 mm, thus maintaining the same overall thickness as conventional plastic cards. The wire coil 34 may comprise 42 gauge copper wire.

Referring to the example illustrated in FIG. 8, there are two electromagnets 30, positioned on the housing 12, so that when the adapter 10 is placed in a card reader 44, the electromagnets 30 are aligned with the sensors on the magnetic card reader 44. If the housing 12 is of an embodiment with only a portion that may be inserted in the card reader, the electromagnets 30 of the POS interface circuit 20a are substantially located in the insertable portion. The electromagnets 30 are embedded in the housing in the approximate position of one or more tracks of a magnetic stripe. In the illustrated example, two electromagnets 30 are illustrated, each coil emulating one track of a pre-recorded magnetic stripe. However, one electromagnet 30 may be used to emulate a single track, or three or more electromagnets 30 may be used to emulate three or more tracks. In the given example of electromagnets 30, the inductance of one coil was recorded as ~1 mH, and with a current of 10 mA at 4 kHz a signal strength of 25 mV was generated in the card reader.

The method of dynamically writing data to a set of coils may also be achieved under a different set of physical parameters for the electromagnets 30. Also, devices for producing a dynamically changeable magnetic field other than electromagnets 30 may be used without departing from the scope of the invention.

Figure 9:
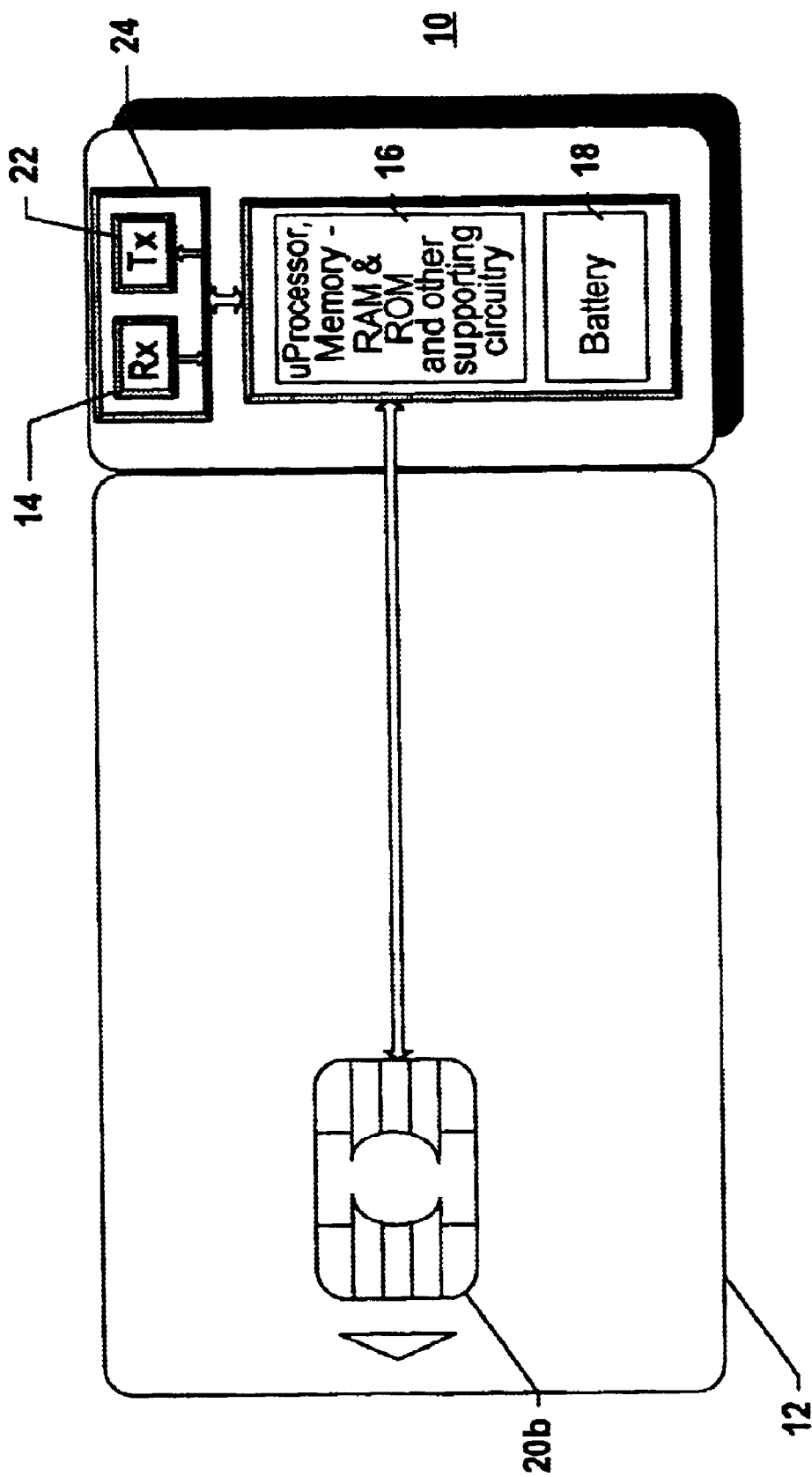
FIG. 9 is an illustration of another example of an adapter of the present invention having a smart card POS interface.
Figure 10:
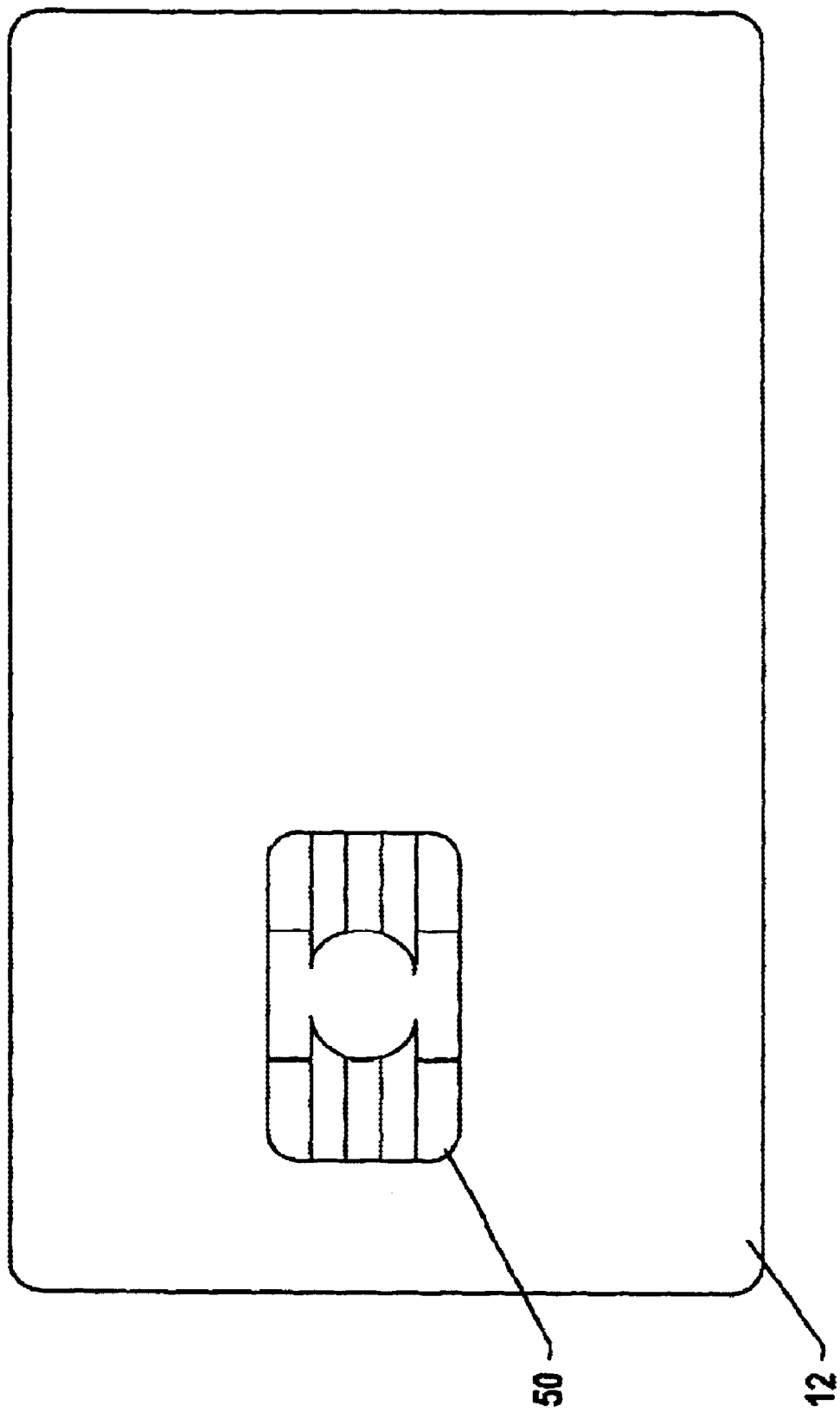
FIG. 10 is another illustration of the example of an adapter card having a smart card POS interface.

Referring to FIGS. 9 and 10, an alternative embodiment of POS interface circuit 20b comprising a smart card interface 50 having metallic contacts 52 is illustrated. "Smart cards" are known plastic cards having electronic storage of information in lieu of, or in addition to, a magnetic stripe. Smart card readers read information from "Chip on Plastic" by physical (metallic) contact with the IC on the Smart Card. According to ISO 7816, eight contacts are provided on a smart card; I/O (serial date input and output); Vpp (programming voltage input); GND (ground reference voltage); CLK (clock signal); RST (reset); Vcc (power supply); and two contacts reserved for future use. ISO 7816 also provides for contact size, position, electrical signal descriptions, and operating procedure. Emulation of a smart card interface generally involves providing contacts and formatting data in adherence with relevant industry standards, such as, but not limited to, ISO 7816. There may be additional standards to emulate, such as ISO 14443, and other types of smart cards other than credit cards having their own standards.

Figure 11:
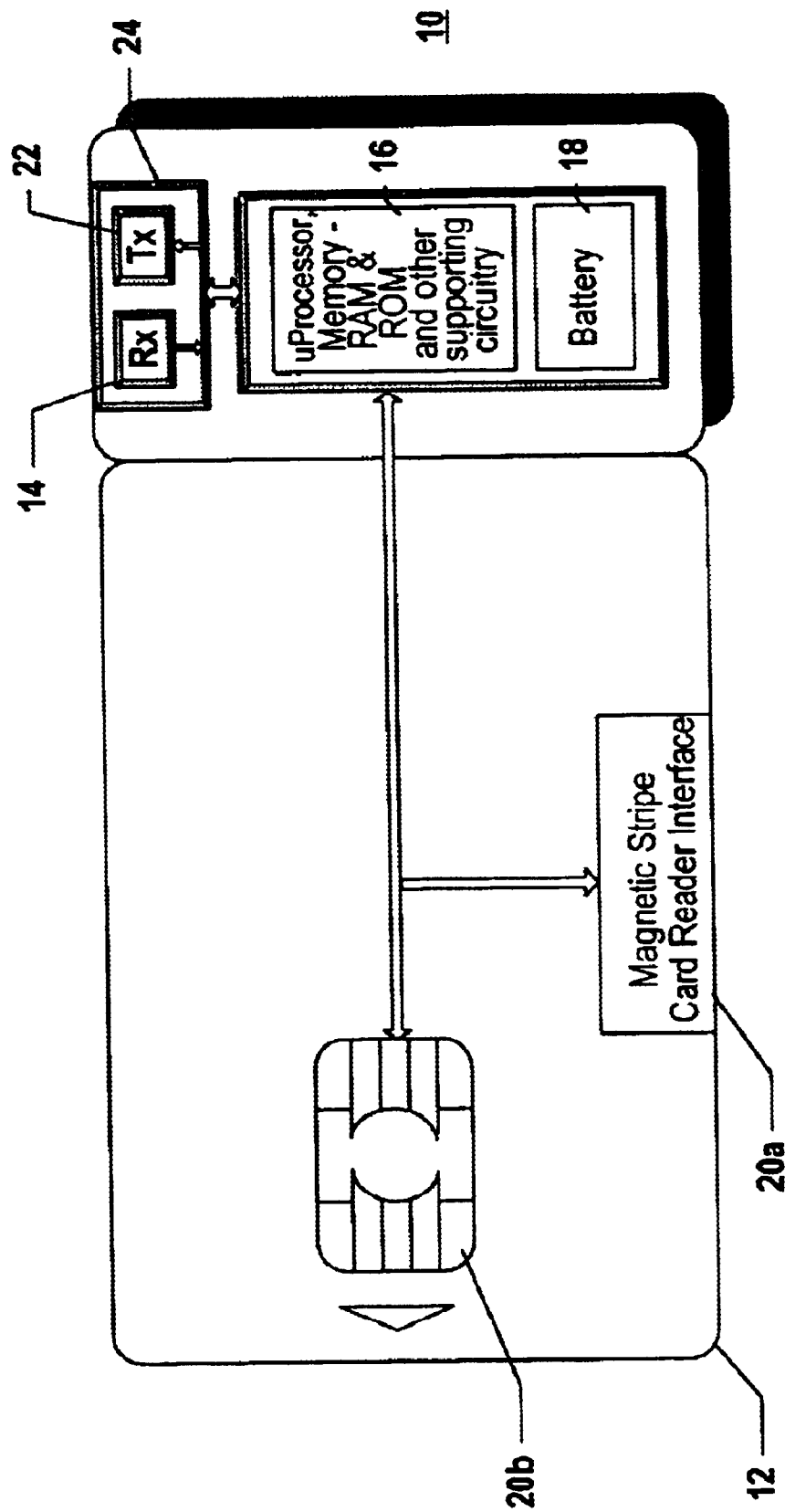
FIG. 11 is an illustration of another example of an adapter of the present invention having a smart card POS interface and a magnetic stripe POS interface.

Referring to FIG. 11, another alternative embodiment of the adapter 10 is illustrated. In this embodiment, both POS interface 20a comprising electromagnets 30 and POS interface 20b comprising a smart card interface 50 are incorporated on a single adapter 10. Additionally, a metallic interface for communicating with devices or networks other than POS terminals may be included. For example, interfaces for wired or wireless telephone circuits may be provided, as may be interfaces for LAN computer networks.

Figure 12:
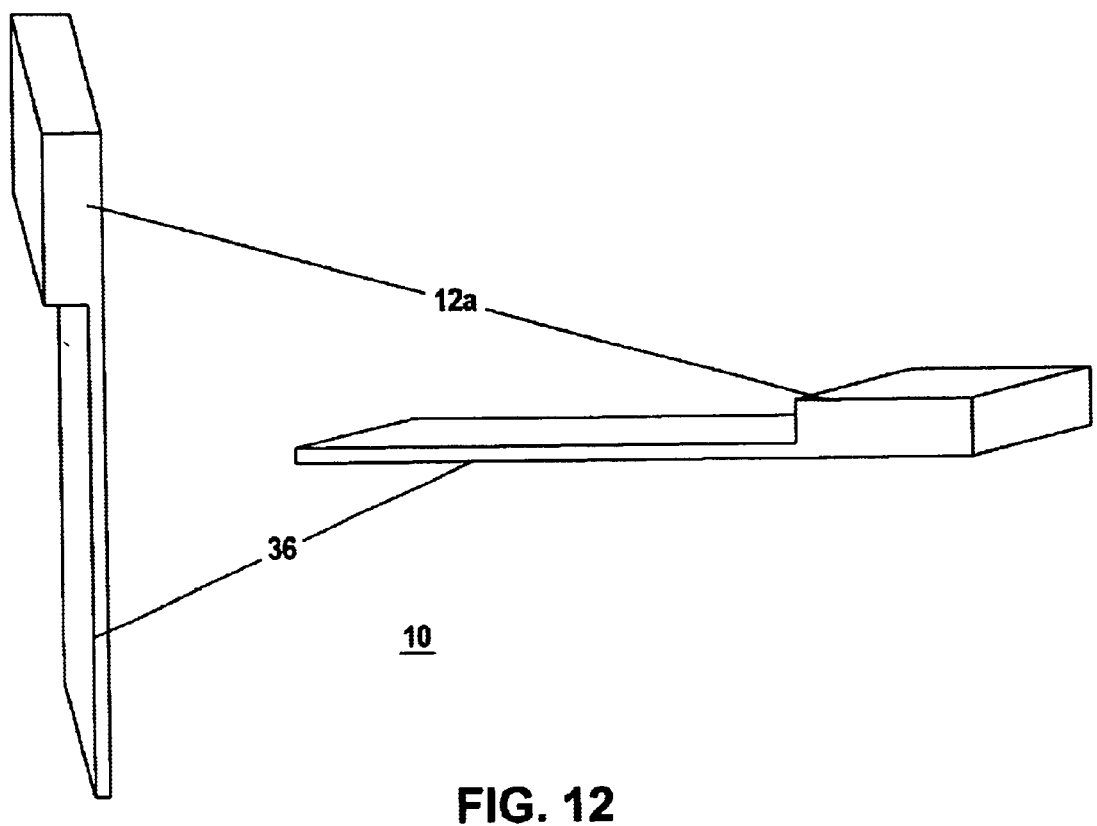
FIG. 12 is an illustration of another example of an adapter card of the present invention.

In an alternative embodiment, illustrated in FIG. 12, housing 12 is not necessarily the same size as a conventional credit card. In the illustrated example, the adapter 10 may be thicker than a conventional credit card in some places, to accommodate circuitry or batteries or the like. The adapter 10 may further comprise a housing 12a having a portion 36 that is insertable in a card reader 44. The POS interface 20, electromagnets 30, for example, may be located in the reader insertable portion 36. In another example, the adapter 10 may be configured as a lid or cover for an electronic transaction device, wired into the electronic transaction device, the cover being flipped open for use.

Figure 13:
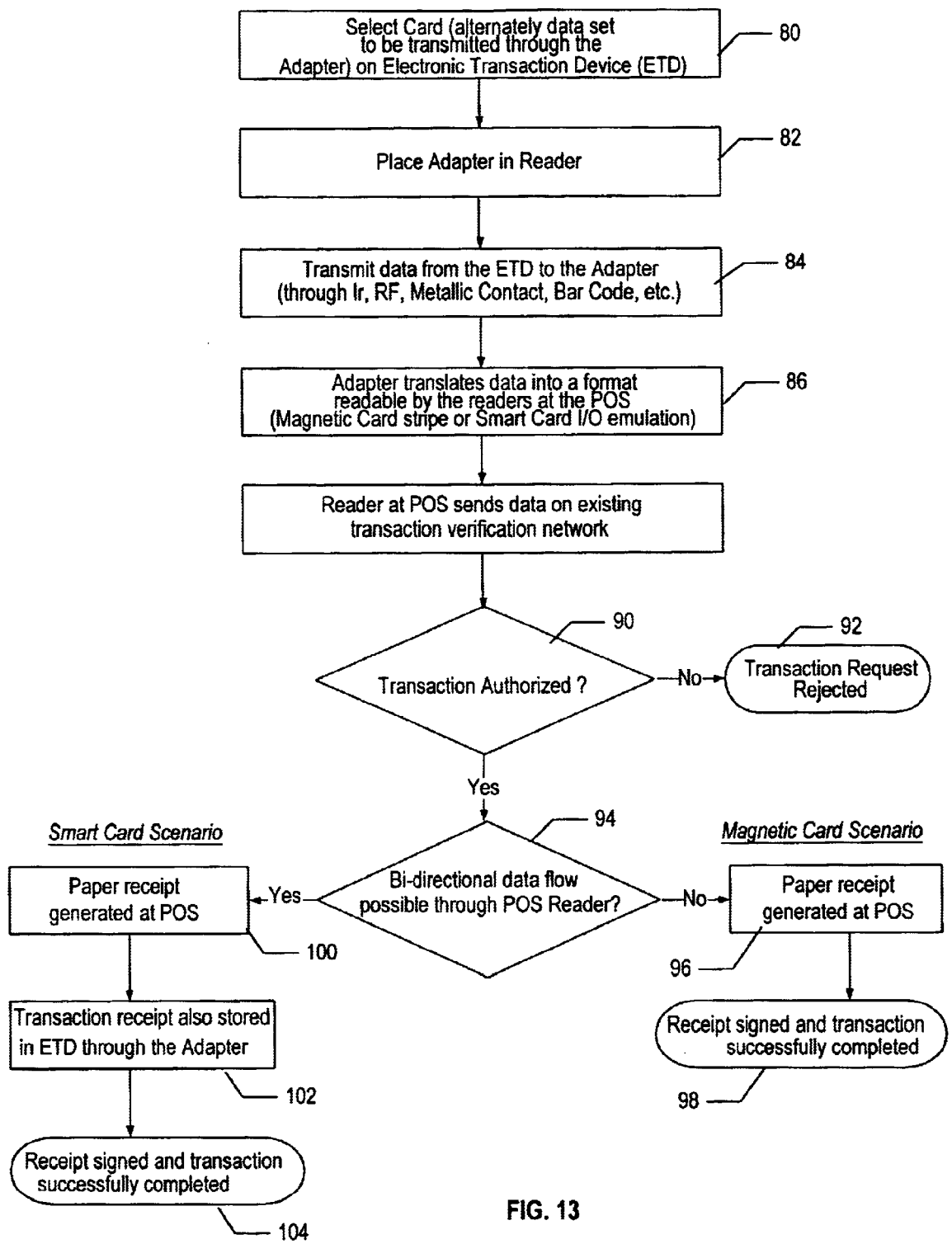
FIG. 13 is a flow chart of a method of use of the present invention.

Referring to FIG. 13, in use, in step 80, a user selects a card to be transmitted to the adapter. In step 82, the adapter 10 is placed in the card reader 44 with the POS interface circuit 20 positioned near the sensors of the card reader 44. Rather than recording predetermined data spatially on a card, and requiring a "swipe," the adapter 10 may be held stationary during a read operation. In step 84, an electronic transaction device 60 transmits the information via I/O interface 68 that would typically be pre-recorded on a magnetic stripe 42 to the adapter 10 by infra-red circuitry, proximity radio frequency circuitry, or other suitable wired or wireless communication means. In step 86, the adapter 10 receives the information via receive circuit 14 (alternatively, transceiver 24), formats the information to conform with conventional card reader formats, and dynamically writes-data to the POS interface 20 (in the illustrated example, electromagnets 30) thereby emulating a swipe of a conventionally pre-recorded magnetic stripe 42.

The adapter 10 writes the data at a rate and format in which card readers 44 are designed to read the data. In one illustrated example, a processor 16 dynamically writes data to the POS interface circuit 20. The electromagnets 30 of the POS interface circuit 20 on being energized by the battery, generate a magnetic field. The processor 16 is supported by digital to analog converters and software routines and dynamically writes data to the POS interface circuit 20. The magnetic fields generated by the POS interface circuit 20 are sensed by the card reader 44. Because the adapter 10 is not "swiped," data is dynamically written to the POS interface circuit 20 emulate a conventional card swipe. The processor 16 and POS interface circuit 20 converts digital data into an alternating current signal through the electromagnets 30, which induce flux changes in the reading sensor.

In the alternative embodiment including a POS interface circuit 20a comprising a smart card interface 50, the method of use is similar. The electronic transaction device 60 transmits information to the adapter 10, which processes the information and emulates a conventional smart card via contacts 52.

In steps 88 and 90, the card reader 44 sends the data necessary for authorization of the transaction and acts upon the response. If authorization is denied in step 90, the transaction is rejected in step 92.

A check is made in step 94 as to whether bi-directional data flow is possible through the card reader 44. Return communication of information from the adapter 10 to the electronic transaction device is optional. For example, the POS terminal may not be configured to return an electronic receipt to the electronic transaction device through the adapter. In such an example, a conventional paper receipt may be generated and signed in steps 96 and 98. Additionally, the adapter 10 may return confirmation information regardless of whether the card reader 44 is capable of bi-directional data, including an indication that the account information was received and processed by the adapter. Conformation information may also include identification information of the adapter 10, such as retail store location, department, the date of purchase, and a unique identification number.

It is contemplated that POS terminals may be equipped to transmit transactional information to the adapter, such as an electronic receipt. In this case, the POS may generate a paper receipt in step 100 and transmit the transactional information, including, for example, an electronic receipt, to the electronic transaction device 60 via the adapter 10, in step 102. The receipt may be signed in step 104.

It is contemplated that the user of an electronic transaction device 60 may not want to hand an electronic transaction device to a merchant. For example, in a restaurant, credit card transactions are often accomplished by handing a conventional plastic credit card to a member of the waitstaff who, in turn, takes the card to a card reader, swipes the card through the card reader, and returns the card to the user. Due to the extensive amount of information included on an electronic transaction device 60, however, users may be reluctant to hand such a device to the waitstaff.

According to another example of the present invention, therefore, the adapter 10 may temporarily buffer information from an electronic transaction device to subsequently conduct a transaction outside the range of the electronic transaction device's infra-red or radio frequency capabilities. Continuing with the restaurant scenario, the waitstaff presents the adapter 10 and the user transmits relevant information from the user's electronic transaction device 60 to the adapter 10. The adapter 10 stores the information in a buffer, such as memory, registers, or other suitable storage means, until the waitstaff has an opportunity to run the adapter 10 through the card reader 44. After being read, the buffer is purged. The data buffer may be purged after a predetermined period of time or after a predetermined number of data transfers.

Optionally, the adapter 10 may be configured to buffer information from more than one electronic transaction device 60. Such a configuration would facilitate persons sharing the expenses of a transaction, such as when splitting the bill at a restaurant. Also, such a configuration would facilitate collecting payment information corresponding to more than one transaction.

In an alternative embodiment, the adapter 10 can receive information from the card reader 44 and transmit the information back to the electronic transaction device. In this embodiment, the receive circuit 14 further comprises a transmit circuit 22. Continuing with the restaurant scenario, the POS terminal transfers details of the transaction to the adapter 10. The waitstaff returns the adapter 10 to the proximity of the electronic transaction device 60, and transfers the details of the transaction to the electronic transaction device 60.

Figure 14:
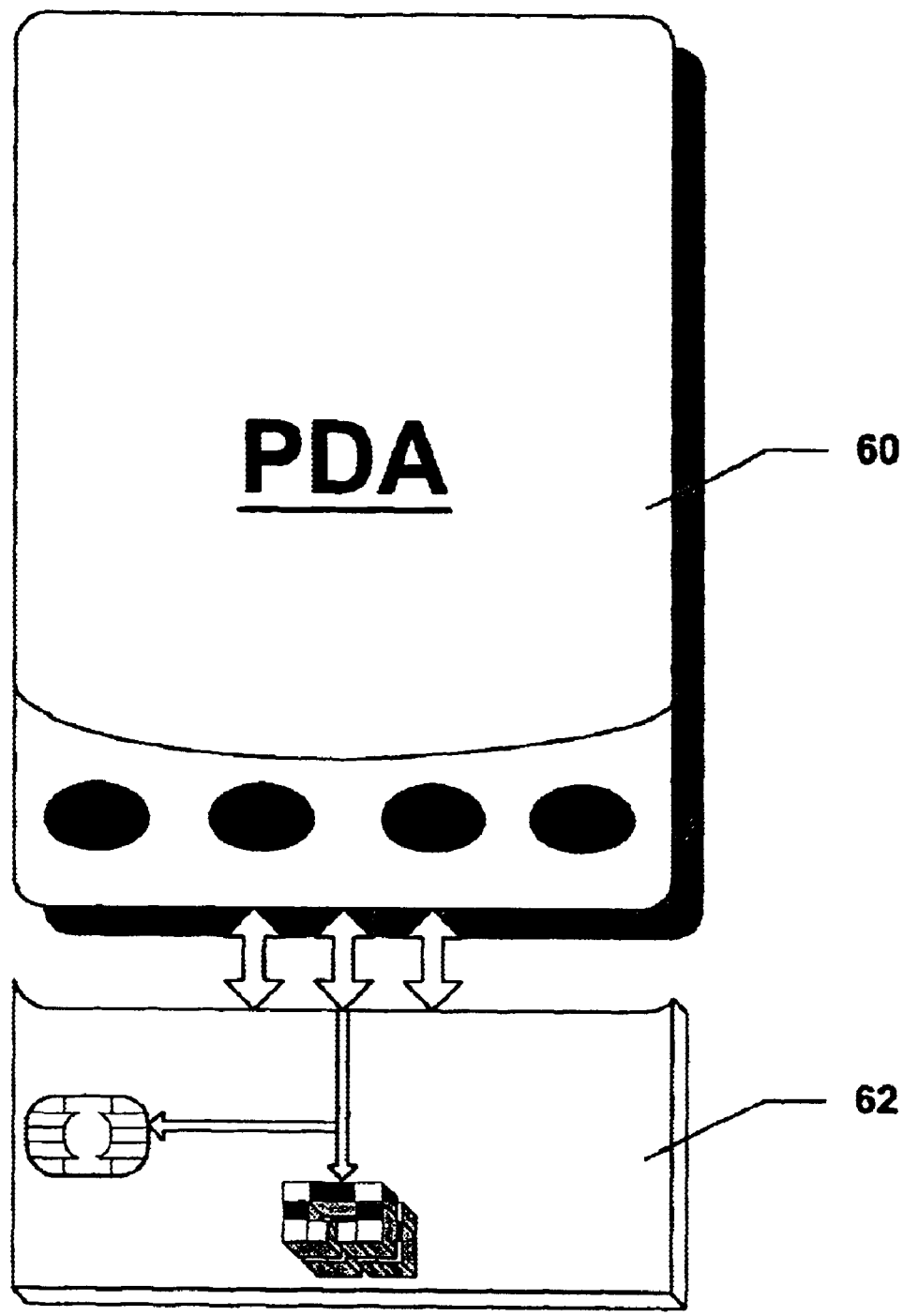
FIG. 14 is an illustration of an electronic transaction device including another example of the present invention.
Figure 15:
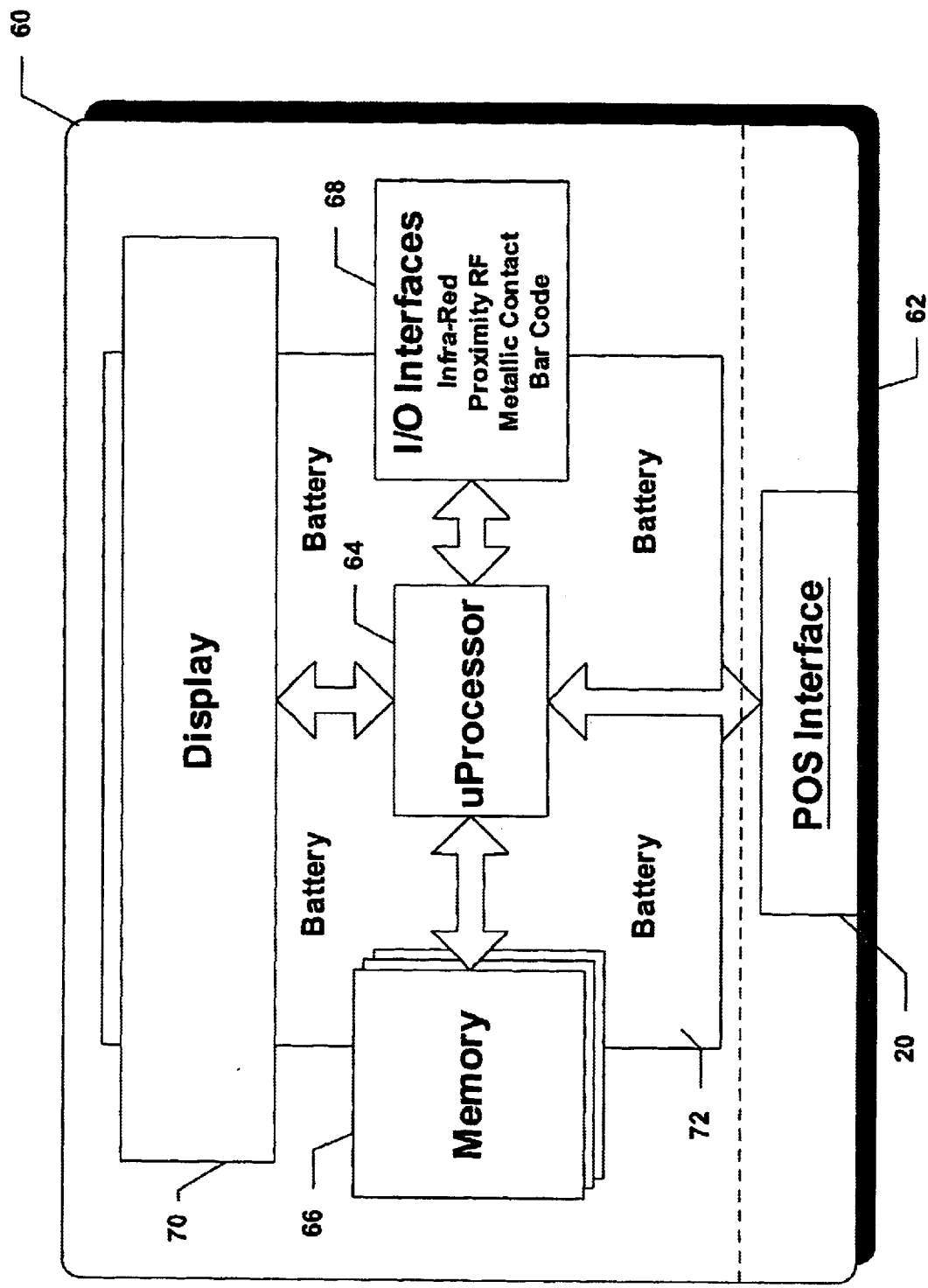
FIG. 15 is a block diagram of an electronic transaction device including another example of the present invention.

The present invention is not limited to stand-alone adapters. In another alternative embodiment, illustrated in FIGS. 14 and 15, an electronic transaction device 60 includes an extension 62 that includes the POS interface circuit 20. The electronic transaction device 60 may comprise a microprocessor 64, coupled with memory 66 adapted to store an operating system, BIOS, applications and user data, I/O interfaces 68, display 70, and battery 72. One example of interacting with an electronic transaction device 60 is when display 70 further comprises a touch sensitive liquid crystal display. Other modes of interacting include keypads (in the example of a wireless telephone), pointing devices and conventional reduced-size "QWERTY" keyboards. Typical input and output interfaces that may comprise I/O interface 68 may comprise infrared devices, including those adhering to IrDA standards, proximity radio frequency devices, such as the "Bluetooth" standard, metallic contacts, such as the RS-232 standard, or bar codes.

The data flow to the POS interface 20 is controlled by the microprocessor 64 and other supporting hardware and software of the electronic transaction device 60. The extension 62 may be part of a housing for the electronic transaction device 60, or a separate add-on module or circuit board. For example the extension 62 may plug into an expansion slot on an electronic transaction device 60, or comprise a lid or cover for the electronic transaction device 60 that may be flipped open for use. In another example, illustrated in FIG. 15, the extension 62 is clipped on to the serial port of an electronic transaction device 60.

What is claimed is:

1. An adapter for use with point of sale card readers, the adapter comprising:
    a) a housing, including at least a reader-insertable portion capable of being inserted in the card reader;
    b) a receive circuit in the housing, the receive circuit adapted to receive information from an electronic transaction device;
    c) a processor in the housing connected to the receive circuit, the processor configured to have adapter identification information; and
    d) a point of sale interface in the reader insertable portion of the housing connected to the processor, the point of sale interface adapted to transmit information received from the electronic transaction device.

2. The adapter of claim 1, wherein the housing is substantially the same size as a conventional credit card.

3. The adapter of claim 1, wherein the point of sale interface comprise a magnetic stripe emulator.

4. The adapter of claim 3, wherein the magnetic stripe emulator comprises at least one electromagnet.

5. The adapter of claim 3, wherein the magnetic stripe emulator comprises a plurality of electromagnets.

6. The adapter of claim 1, wherein the point of sale interface comprises a smart card emulator.

7. The adapter of claim 1, wherein the point of sale interface comprises a magnetic stripe emulator and a smart card emulator.

8. The adapter of claim 1, wherein the receive circuit comprises an infra-red sensitive device.

9. The adapter of claim 1, wherein the receive circuit comprises a radio-frequency circuit.

10. The adapter of claim 1, further comprising a transmit circuit, wherein the receive circuit and the transmit circuit comprise a transceiver.

11. The adapter of claim 1, further comprising a data buffer connected to the processor adapted to store information received from the electronic transaction device.

12. The adapter of claim 11, wherein the data buffer is configured to purge at least a portion of the information received from the electronic transaction device after a predetermined period of time.

13. The adapter of claim 11, wherein the data buffer is configured to purge at least a portion of the information received from the electronic transaction device after a predetermined number of data transfer operations.

14. The adapter of claim 1, wherein the processor further comprises a data buffer adapted to store information received from the electronic transaction device.

15. The adapter of claim 14, wherein the data buffer is configured to purge at least a portion of the information received from the electronic transaction device after a predetermined period of time.

16. The adapter of claim 14, wherein the data buffer is configured to purge at least a portion of the information received from the electronic transaction device after a predetermined number of data transfer operations.

17. An adapter for use with point of sale card readers, the adapter comprising:
    a) a housing, capable of being inserted in the card reader;
    b) a transceiver in the housing the transceiver adapted to receive information from an electronic transaction device;
    c) a processor in the housing connected to the transceiver, the processor configured to have adapter identification information; and d) an electromagnet configured to emulate a magnetic stripe in accordance with information received from the electronic transaction device connected to the processor.

18. The adapter of claim 17, wherein the housing is substantially the same size as a conventional credit card.

19. The adapter of claim 17, further comprising a smart card emulator connected to the processor.

20. The adapter of claim 17, wherein the transceiver comprises an infra-red transceiver.

21. The adapter of claim 17, wherein the transceiver comprises a radio-frequency transceiver.

22. The adapter of claim 17, further comprising a data buffer connected to the processor, the data buffer configured to purge at least a portion of the information received from the electronic transaction device after a predetermined period of time.

23. The adapter of claim 17, further comprising a data buffer connected to the processor, the data buffer configured to purge at least a portion of the information received from the electronic transaction device after a predetermined number of data transfer operations.

24. A method of using an adapter with a point of sale card reader, comprising:

a) selecting a card on an electronic transaction device;

b) placing the adapter in the card reader;

c) transmitting information corresponding to the selected card from the electronic transaction device to the adapter;

d) the adapter converting the information corresponding to the selected card to a format readable by the card reader;

e) the card reader reading the converted information; and f) the adapter providing adapter identification information to the electronic transaction device.

25. The method of claim 24, wherein the step of converting the information corresponding to the selected card to a format readable by the card reader further comprises emulating a magnetic stripe.

26. The method of claim 25, wherein the step of emulating a magnetic stripe comprises generating electromagnetic signals.

27. The method of claim 25, wherein the step of emulating a magnetic stripe further comprises:

a) receiving the information corresponding to the selected card;

b) formatting the information corresponding to the selected card to conform with magnetic stripe standards; and c) dynamically writing the formatted information to an electromagnet.

28. The method of claim 24, wherein the step of converting the information corresponding to the selected card to a format readable by the card reader further comprises emulating a smart card.

29. The method of claim 28, wherein the step of emulating a smart card further comprises:

a) receiving the information corresponding to the selected card;

b) formatting the information corresponding to the selected card to conform with smart card standards; and c) dynamically writing the formatted information to electrical contacts conforming with smart card standards.

30. The method of claim 24, wherein the step of placing the adapter in the card reader occurs before the step of transmitting information.

31. The method of claim 24, wherein the step of transmitting information occurs before placing the adapter in the card reader, and further comprising the step of buffering the information corresponding to the selected card in the adapter.

32. The method of claim 31, further comprising the step of purging the information corresponding to the selected card after the step of reading the magnetic fields at the card reader.

33. The method of claim 31, further comprising the step of purging the information corresponding to the selected card after a predetermined period of time.

34. The method of claim 31, further comprising the step of purging the information corresponding to the selected card after a predetermined number of data transfer operations.

35. The method of claim 24, further comprising the adapter transmitting confirmation information to the electronic transaction device.

36. The method of claim 24, wherein the step of the adapter transmitting information to the electronic transaction device includes transmitting an electronic receipt to the electronic transaction device.

37. The method of claim 31, further comprising the step of purging the information corresponding to the selected card after the step of the adapter transmitting information to the electronic transaction device.

38. The adapter of claim 1, wherein the adapter identification information comprises an identification number.

39. The adapter of claim 1, wherein the adapter identification information comprises a retail store name.

40. The method of claim 24, wherein the steps are performed in the order recited.

* * * * *